Aug. 3, 1926.
L. PELTON
AUTOMOBILE
1,594,687
Filed Feb. 27, 1923
2 Sheets-Sheet 1
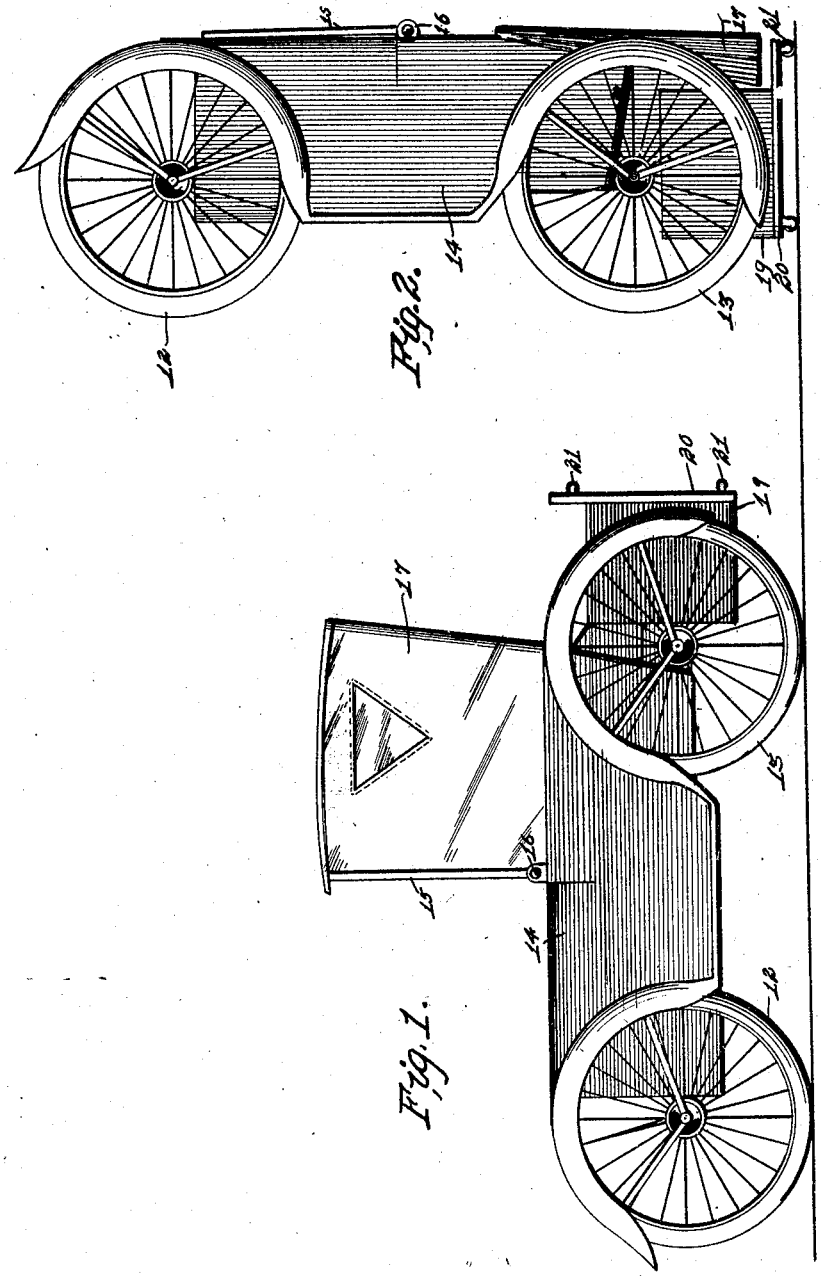

Aug. 3, 1926.
L. PELTON
AUTOMOBILE
Filed Feb. 27, 1923      2 Sheets-Sheet 2
1,594,687
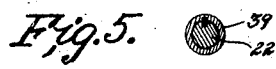
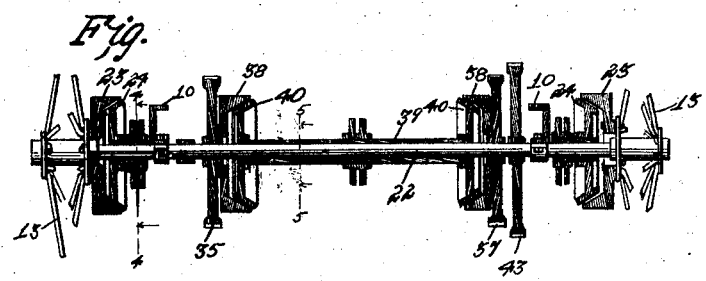
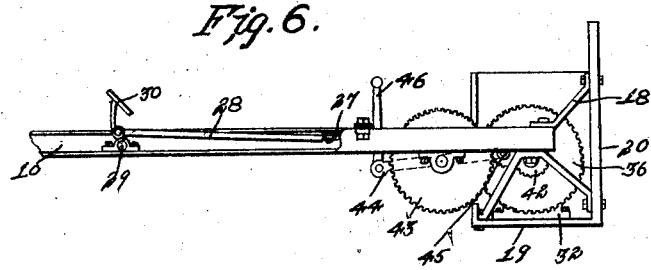
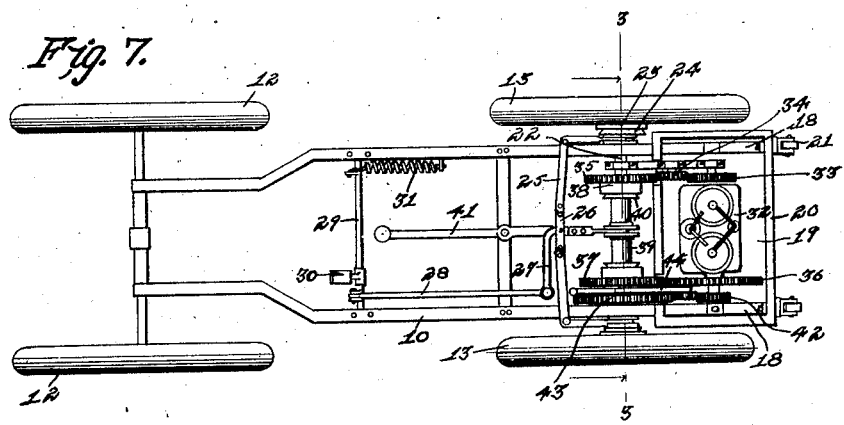
Inventor
Leander Pelton
by Orwig & Hague  Att'ys.

Patented Aug. 3, 1926.

1,594,687

UNITED STATES PATENT OFFICE.

LEANDER PELTON, OF DES MOINES, IOWA.

AUTOMOBILE.

Application filed February 27, 1923. Serial No. 621,565.

The objects of my invention are to provide an automobile of simple, durable and inexpensive construction, and of relatively small size and light weight, constructed, arranged and designed so that when it is desired to park it, the operator may readily and easily elevate its front end and raise it to a vertical position where is will be supported upon an especially constructed supporting platform, which normally stands in an upright position at the rear of the automobile, and which is provided with caster wheels so that when the automobile is thus parked in an upright position, it may be readily and easily moved about while remaining in said position, and whereby a large number of said automobiles may be parked or stored in a relatively small area.

A further object is to provide an automobile of this character in which the relative positions of the body of the automobile in which the driver is seated, the engine and heavy parts are so arranged with relation to the rear axle that when the occupant descends from the automobile, the weight of the parts in front of the rear axle would only be slightly heavier than the weight of the parts in the rear of the axle to facilitate the movement of the automobile from its normal horizontal operative position to its vertical inoperative position.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of an automobile embodying my invention and in its normal operative position.

Figure 2 shows a side elevation of same in its vertical position for convenience in parking and storing.

Figure 3 shows an enlarged, detail, sectional view of the rear axle on the line 3—3 of Figure 7.

Figure 4 shows a sectional view on the line 4—4 of Figure 3.

Figure 5 shows a sectional view on the line 5—5 of Figure 3.

Figure 6 shows a side elevation of a part of the automobile frame illustrating the manner in which the engine casing and supporting platform are connected to the main frame; and Figure 7 shows a top or plan view of the main frame illustrating the arrangement of the engine and other working parts relative to the rear axle.

Referring to the accompanying drawings I have used the reference numeral 10 to indicate generally the main frame of the automobile. 12 indicates the front or steering wheels, and 13 the rear or driving wheels.

Mounted upon the main frame is an automobile body 14 which may be of any desired shape or construction, and which is located in front of the rear axle so that the weight of the occupants of the automobile tends to firmly hold the front wheels on the roadway.

The wind shield 15 is hinged at 16 to the body so it may fold forwardly to position parallel with the top of the automobile body, and the canopy, indicated generally by the reference numeral 17, is capable of folding rearwardly, as shown in Figure 2, in the same manner as now in common use.

At the rear end of the main frame 10 are suitable braces 18 fixed to the frame and shaped and arranged to firmly and securely support an engine casing 19 and a platform 20 in the rear of the axle. This platform 20 extends vertically and is provided with casters 21. These parts are so arranged that the automobile may be placed in an upright position resting upon said casters, and when so placed, the weight of the automobile will be centered close to the center of the platform, so that it will securely stand in said upright position, or may be moved about from place to place on the casters.

The rear axle is indicated by the numeral 22 and the driving wheels 13 are rotatably mounted thereon. Each of the driving wheels is provided with a friction clutch member 23, and slidably and non-rotatably mounted on the axle 22 adjacent to each of the clutch members 23 is a coacting clutch member 24. For each of said clutch members 24 there is a bell crank lever 25, and these levers are connected to a link 26, which link is connected to an arm 27, and this arm 27 is connected by a rod 28 with the shaft 29 on which there is a clutch pedal 30. A spring 31 is provided for normally holding the shaft 29 in position for forcing the clutches 24 into operative engagement with the clutch members 23 on the driving wheels.

The engine is indicated generally by the reference numeral 32, and may be of any ordinary construction, preferably air cooled. On one end of the engine shaft there is a pinion 33 in mesh with an idler pinion 34, which in turn is in mesh with a pinion 35 rotatably mounted on the rear axle 22. On the other end of the engine shaft there is a pinion 36 in mesh with a pinion 37 which is rotatably mounted on the driving axle 22. Each of these pinions 35 and 37 is provided with a friction clutch member 38, and slidably but non-rotatably mounted upon the axle 22 is a sleeve 39, containing on each end a clutch member 40 designed to coact with one or the other of the clutch members 38 when the sleeve 39 is moved to one limit of its movement. This sleeve 39, when in a normal position, holds both of the clutch members 40 out of operative engagement with their coacting clutch members 38.

A lever 41 is connected at its rear end with the sleeve 39, and its front end is extended to position where it may be controlled by the operator.

Fixed to the engine shaft is a small pinion 42, and fixed to the rear axle 22 is a relatively large pinion 43. 44 indicates a lever fulcrumed to a suitable support, and having rotatably mounted on one end a small pinion 45, and on its other end a handle 46 placed in the position to be accessible by the operator.

In one position of the handle 46, the pinion 33 will be in mesh with the pinions 42 and 43, but in another position it will be elevated out of contact with both of said pinions 42 and 43. This last mentioned train of pinions is used by the operator when it is desired to drive the automobile at low speed.

In practical operation of my improved automobile, and assuming that the sleeve 39 is in position for clutching the large pinion 37 to the rear axle, then the automobile is driven in a forward direction at relatively high speed. During the normal forward movement of the automobile, the spring 31 holds the clutch members 24 into frictional engagement with the clutch members 23, thus rotating the driving means.

With this construction, it is not necessary to employ the well known differential gear in the rear axle, because normally when turning around a corner the clutch pedal will be depressed, and when that is done, the driving wheels may rotate at different speeds.

When it is desired to have the automobile move rearwardly, then the lever 41 is manipulated to bring the clutch member 40 into frictional engagement with the clutch member on the pinion 35. The operator may have the engine running at any desired speed and can control the speed of the rearward movement of the automobile by simply slightly depressing the clutch pedal 30, and permitting the friction clutches associated with the driving wheels to slip.

My invention is especially advantageous for persons who desire to park their automobiles in districts where the traffic is congested. At the present time in every city there are districts in which only a small per cent of the people who desire to park their automobiles can find parking space. With my improvement, a greatly increased number of automobiles may be parked in a given area, and when this is to be done, the operator gets out of the car, whereupon the weight of the automobile is nearly balanced upon the rear axle, there being just enough weight in front of the rear axle to normally hold it in its normal position. He can then grasp the front of the automobile and tilt it to an upright position, where it will rest upon the casters, and when it is in this position, it may be moved through an ordinary doorway or a very large number of them could be stored or parked in a comparatively small road of floor area, and before being placed in the upright or parked position, the wind shield and canopy may be moved to their folded position,

I claim as my invention:

1. An improved automobile comprising a frame, supporting and driving wheels therefor, a body in which a driver may be seated, a motor for driving the automobile, means for operatively connecting the motor and said drive wheels, a supporting means fixed to the rear end of the frame and shaped and designed to support the frame in an upright position with the front of the automobile at the top, the relative arrangement of the body, engine and rear axle being such that when the automobile is not occupied, its weight will be nearly centered at the rear axle.

2. An improved automobile comprising a frame, supporting and driving wheels therefor, a body in which a driver may be seated, a motor for driving the automobile, and a supporting means fixed to the rear end of the frame and shaped and designed to support the frame in an upright position with the front of the automobile at the top, the relative arrangement of the body, engine and rear axle being such that when the automobile is not occupied, its weight will be nearly centered at the rear axle.

3. An improved automobile comprising a frame, supporting and driving wheels therefor, a body in which a driver may be seated, a motor for driving the automobile, means for operatively connecting the motor and said drive wheels, a supporting means fixed to the rear end of the frame and shaped and designed to support the frame in an upright position with the front of the automobile at the top, the relative arrangement of the body, engine and rear axle being such that when the automobile is not occupied, its weight will be nearly centered at the rear axle, a top and a wind shield for said body portion, said top and wind shield being adapted to fold adjacent to the said body portion.

4. An improved automobile comprising a frame, supporting and driving wheels therefor, a body portion in which a driver may be seated, a top and wind shield for said body portion, said top and wind shield being designed to fold adjacent to the body portion, the parts being so constructed and arranged that when the top and wind shield are folded, the top of the automobile body and the folded top and wind shield and the upper portion of the tread portion of the wheels will lie in substantially a common plane.

5. An improved automobile comprising a frame, supporting and driving wheels therefor, a body portion in which a driver may be seated, a top and wind shield for said body portion, said top and wind shield being designed to fold adjacent to the body portion, the parts being so constructed and arranged that when the top and wind shield are folded, the top of the automobile body, the folded top and wind shield and the upper portion of the tread portion of the wheels will lie in substantially a common plane, and means located at the rear end of said automobile body for supporting the said body in an upright position, substantially as described and for the purposes stated.

Des Moines, Iowa, February 17, 1923.

LEANDER PELTON.